(12) United States Patent
Okamura

(10) Patent No.: US 7,949,743 B2
(45) Date of Patent: May 24, 2011

(54) SEARCH SYSTEM, MANAGEMENT SERVER, MOBILE COMMUNICATION DEVICE, SEARCH METHOD, AND PROGRAM

(75) Inventor: Yusaku Okamura, Tokyo (JP)

(73) Assignee: NEC Corporation, Tokyo (JP)

( * ) Notice: Subject to any disclaimer, the term of this patent is extended or adjusted under 35 U.S.C. 154(b) by 495 days.

(21) Appl. No.: 12/055,564

(22) Filed: Mar. 26, 2008

(65) Prior Publication Data

US 2008/0307060 A1 Dec. 11, 2008

(30) Foreign Application Priority Data

Mar. 28, 2007 (JP) ................................ 2007-084943

(51) Int. Cl.
*G06F 15/173* (2006.01)
(52) U.S. Cl. .......................... 709/223; 703/226; 703/203
(58) Field of Classification Search .................. 709/203, 709/223, 226
See application file for complete search history.

(56) References Cited

U.S. PATENT DOCUMENTS

| | | | |
|---|---|---|---|
| 6,920,330 B2 * | 7/2005 | Caronni et al. ............. | 455/456.1 |
| 7,295,119 B2 * | 11/2007 | Rappaport et al. .......... | 340/572.4 |
| 2003/0018704 A1 * | 1/2003 | Polychronidis et al. ...... | 709/202 |
| 2003/0065805 A1 * | 4/2003 | Barnes, Jr. .................... | 709/231 |
| 2005/0210131 A1 * | 9/2005 | Motoyama et al. ........... | 709/224 |
| 2006/0129691 A1 * | 6/2006 | Coffee et al. ................. | 709/230 |
| 2006/0149844 A1 * | 7/2006 | Droz et al. .................... | 709/227 |
| 2006/0253559 A1 * | 11/2006 | Espina Perez et al. ....... | 709/222 |
| 2006/0258370 A1 * | 11/2006 | Sudit et al. ................. | 455/456.1 |
| 2007/0021125 A1 * | 1/2007 | Zhu et al. .................. | 455/456.1 |
| 2007/0180082 A1 * | 8/2007 | Abraham et al. ............. | 709/223 |
| 2007/0185985 A1 * | 8/2007 | Shim et al. .................... | 709/223 |

FOREIGN PATENT DOCUMENTS

JP 2005003627 A 1/2005

* cited by examiner

*Primary Examiner* — Phuoc Nguyen

(57) ABSTRACT

When a mobile terminal device detects the existence of the feature information of an article whose position is requested to be searched, it notifies an article management server of the detected position information and the time information together with the feature information of the article, and the article management server notifies a terminal device of the position information of the target estimated based on the detected position information, the time information and the feature information of the target and causes the terminal device to output the information. With this operation, when an article and the like are searched, they can be effectively searched even if they are not provided with a wireless tag, and thus a probability of discovery can be enhanced.

10 Claims, 5 Drawing Sheets

F I G. 2

| PHONE NUMBER / IP ADDRESS INFORMATION | POSITION INFORMATION | ARTICLE FEATURE INFORMATION | DATE AND TIME INFORMATION |
|---|---|---|---|
| 09011111111 | 139.523E,35.376N,10m | COAT WITH PINK PATTERN | 2007.04.11 08:00 |
| 09011111112 | 100.2E,40.8N,5m | BAR CODE | 2007.04.11 11:00 |
| 09011111113 | 139.523E,35.376N,2m | NOISE OF 400 HZ | 2007.04.11 15:00 |
| 09011111114 | 128.9E,42.1N,1m | MAN'S VOICE | 2007.04.11 21:00 |
| | | | |
| | | | |
| | | | |
| | | | |
| | | | |
| | | | |

| FEATURE INFORMATION OF ARTICLE | COAT WITH PINK PATTERN | ATTACHED FILE (PHOTOGRAPH) OR (VOICE DATA) |
| --- | --- | --- |
| | OR | |
| | SAMPLE OF MAN'S VOICE | |

| LOCATION OR POSITION INFORMATION | SECOND FLOOR |
| --- | --- |
| | OR |
| | 130E, 35N, RADIUS OF 500 M |

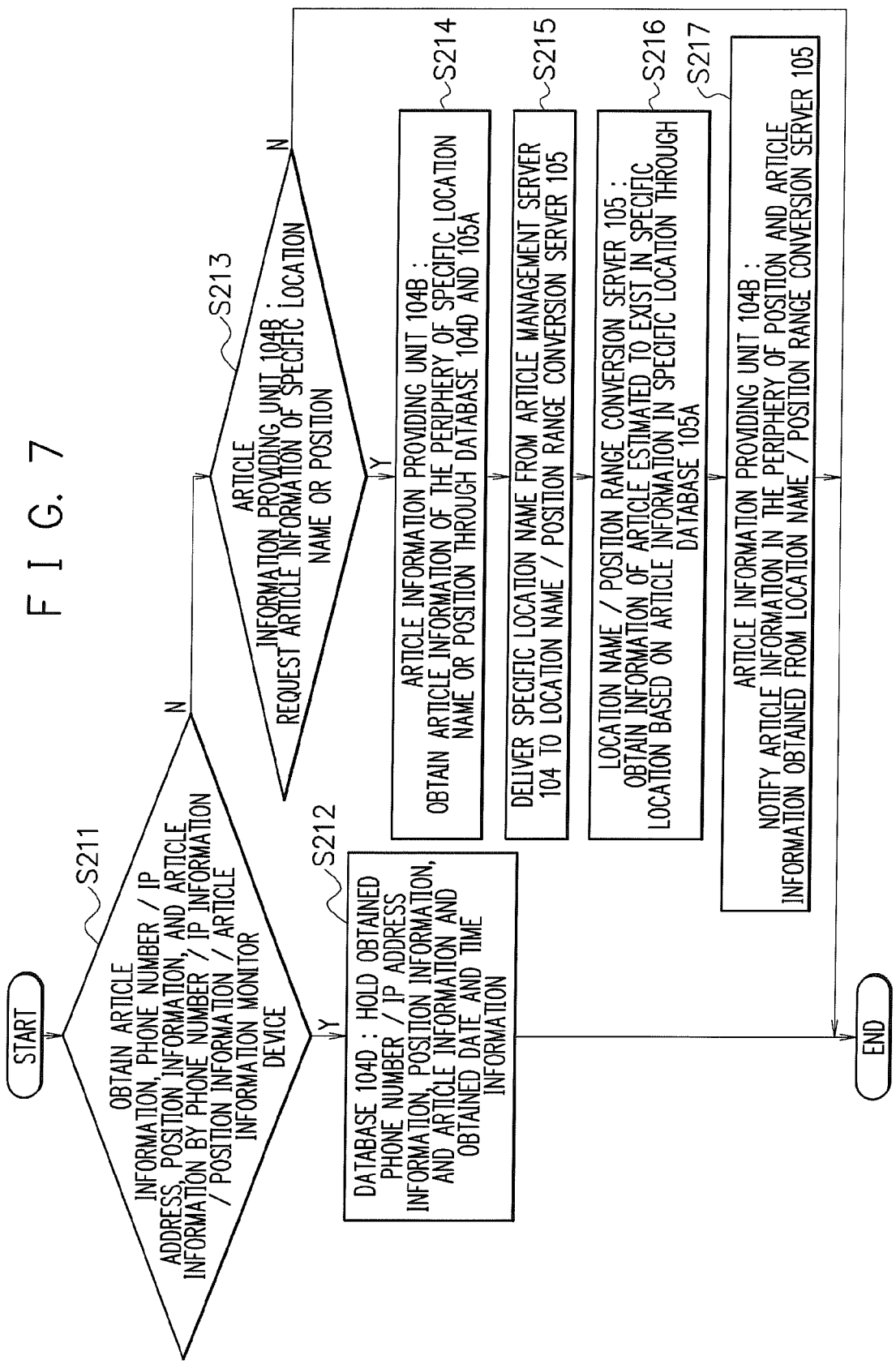

ature information of the target whose position is requested to be searched exists based on the target information obtained from the management server, wherein when the mobile communication device detects the existence of the feature information of the target whose position is requested to be searched, the mobile communication device notifies the management server of the detected position information and the time information together with the feature information of the target, and the management server notifies the terminal device of the position information of the target estimated based on the detected position information, the time information and the feature information of the target and causes the terminal device to output the information.

SEARCH SYSTEM, MANAGEMENT SERVER, MOBILE COMMUNICATION DEVICE, SEARCH METHOD, AND PROGRAM

This application is based upon and claims the benefit of priority from Japanese patent application No. 2007-084943, filed on Mar. 28, 2007, the disclosure of which is incorporated herein in its entirety by reference.

BACKGROUND OF THE INVENTION

1. Field of the Invention

The present invention relates to a technology for searching an article and the like, and more particularly, to a technology for searching an article and the like making use of a mobile terminal and the like provided with various types of sensors.

2. Description of Related Art

In the field of mobile communication devices such as mobile phones and the like, mobile phones and the like, to which GPS (Global Positioning System) is assembled to measure the position thereof, have come into practically used, and a position measuring function such as GPS is installed on mobile phones and the like as a standard function.

Further, there is being established such a system that tags called wireless tags, to which an electronic circuit is assembled, are attached to articles and the like and information buried to the wireless tags is read by wireless tag detectors so that the ID codes, owners and the like of the articles can be discriminated.

In view of the tendency of the above technologies, Japanese Patent Application Laid-Open Publication No. 2005-003627 proposes a system for contributing to discover an article, to which a wireless tag is attached, when the article is lost or stolen, by searching the article making use of a plurality of mobile communication devices.

Next, a problem of the related art described above will be explained.

Since the related art is a system for notifying the contents of a wireless tag making use of a mobile communication device, it has a problem in that the search of an article and the like without a wireless tag is not taken into consideration.

SUMMARY OF THE INVENTION

The present invention intends to solve the problem described above. For this purpose, an exemplary object of the present invention is to provide a search system, a management server, a mobile communication device, a search method, and a program which can effectively search an article and the like even if they are not provided with a wireless tag and to improve a probability of discovery.

[Search System]

To achieve the above exemplary object, a search system as a first aspect of the present invention includes a terminal device for requesting a management server to search a position at which a target whose location is desired to be searched exists by sending search request information, which includes at least the information of the target and the feature of the target, to the management server, the management server for receiving the search request from the terminal device and issuing target information, which includes at least target identification information for identifying respective targets and the feature information of the respective targets, to a mobile communication device based on the search request information and at least one mobile communication device which includes a unit for obtaining the feature information of the target and a unit for measuring the position of the mobile communication device and searches the position at which the

[Management Server]

A management server of a search system as a second exemplary aspect of the present invention includes a terminal device for requesting a management server to search a position at which a target whose location is desired to be searched exists by sending search request information, which includes at least the information of the target and the feature of the target, to the management server, the management server for receiving the search request from the terminal device and issuing target information, which includes at least target identification information for identifying respective targets and the feature information of the respective targets, to a mobile communication device based on the search request information, and at least one mobile communication device which includes a unit for obtaining the feature information of the target and a unit for measuring the position of the mobile communication device and searches the position at which the feature information of the target whose position is requested to be searched exists based on the target information obtained from the management server, wherein when the mobile communication device detects the existence of the feature information of the target whose position is requested to be searched, the management server is notified of the detected position information and the time information together with the feature information of the target, and the management server notifies the terminal device of the position information of the target estimated based on the detected position information, the time information and the feature information of the target and causes the terminal device to output the information.

[Mobile Communication Device]

Further, a mobile communication device as a third exemplary aspect of the present invention includes a terminal device for requesting a management server to search a position at which a target whose location is desired to be searched exists by sending search request information, which includes at least the information of the target and the feature of the target, to the management server, a management server for receiving the search request from the terminal device and issuing target information, which includes at least target identification information for identifying respective targets and the feature information of the respective targets, to a mobile communication device based on the search request information, and at least one mobile communication device which includes a unit for obtaining the feature information of the target and a unit for measuring the position of the mobile communication device and searches the position at which the feature information of the target whose position is requested to be searched exists based on the target information obtained from the management server, wherein when the mobile communication device detects the existence of the feature information of the target whose position is requested to be searched, the mobile communication device notifies the detected position information and time information together with the feature information of the target, and the management server notifies the terminal device of the position information of the target estimated based on the detected position information, the time information and the feature information of the target and causes the terminal device to output the information.

[Search Method]

Further, in a search method as a fourth exemplary aspect of the present invention making use of a terminal device for requesting a management server to search a position at which a target whose location is desired to be searched exists by sending search request information, which includes at least the information of the target and the feature of the target, to the management server, the management server for receiving the search request from the terminal device and issuing target information, which includes at least target identification information for identifying respective targets and the feature information of the respective targets, to a mobile communication device based on the search request information, and at least one mobile communication device which includes a unit for obtaining the feature information of the target and a unit for measuring the position of the mobile communication device and searches the position at which the feature information of the target whose position is requested to be searched exists based on the target information obtained from the management server, the search method includes the steps of notifying, when the mobile communication device detects the existence of the feature information of the target whose position is requested to be searched, the management server of the detected position information and time information together with the feature information of the target from the mobile communication device, and notifying the terminal device of the position information of the target estimated based on the detected position information, the time information and the feature information of the target from the management server and causing the terminal device to output the position information.

[Program]

A program as a fifth exemplary aspect of the present invention for causing a management server to execute a processing for receiving the notification, when the mobile communication device detects the existence of the feature information of a target whose position is requested to be searched, of the detected position information and time information together with the feature information of the target, and a processing for notifying the terminal device of the position information of the target estimated based on the detected position information, the time information and the feature information of the target and causing the terminal device to output the information, wherein the search system includes the terminal device for requesting a management server to search a position at which the target whose location is desired to be searched exists by sending search request information, which includes at least the information of the target and the feature of the target, to the management server, the management server for receiving the search request from the terminal device and issuing target information, which includes at least target identification information for identifying respective targets and the feature information of the respective targets, to a mobile communication device based on the search request information, and at least one mobile communication device which includes a unit for obtaining the feature information of the target and a unit for measuring the position of the mobile communication device and searches the position at which the feature information of the target whose position is requested to be searched exists based on the target information obtained from the management server.

Further, a program as a sixth exemplary aspect of the present invention for causing a mobile communication device to execute a processing, when the existence of the feature information of the target whose position is requested to be searched is detected, for notifying of the detected position information and the time information together with the feature information of the target the managing server, and a management server to notify the terminal device of the position information of the target estimated based on the detected position information, the time information and the feature information of the target and output the information, wherein the search system includes the terminal device for requesting a management server to search a position at which a target whose location is desired to be searched exists by sending search request information, which includes at least the information of the target and the feature of the target, to the management server, the management server for receiving the search request from the terminal device and issuing target information, which includes at least target identification information for identifying respective targets and the feature information of the respective targets, to a mobile communication device based on the search request information and at least one mobile communication device which includes a unit for obtaining the feature information of the target and a unit for measuring the position of the mobile communication device and searches the position at which the feature information of the target whose position is requested to be searched exists based on the target information obtained from the management server.

BRIEF DESCRIPTION OF THE DRAWINGS

FIG. 2 is a view showing an arrangement example of a database of an article management server according to the exemplary embodiment of the present invention;

FIG. 7 is a flowchart showing a processing operation according to the exemplary embodiment of the present invention.

DESCRIPTION OF THE EXEMPLARY EMBODIMENTS

An exemplary embodiment of the present invention will be explained below in detail referring to drawings.

Figure 1:
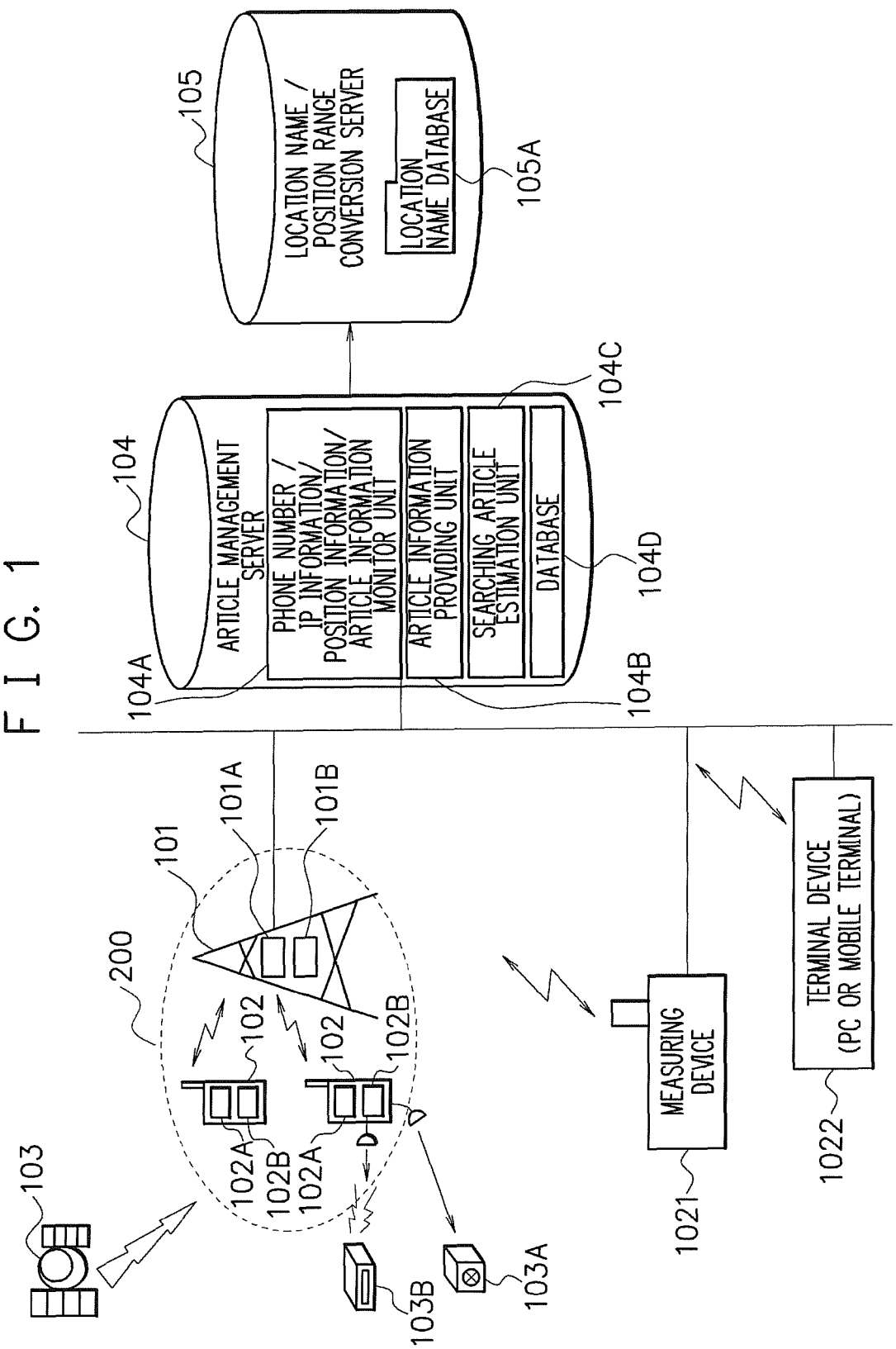
FIG. 1 is an overall arrangement view of a search system according to an exemplary embodiment of the present invention.

FIG. 1 is an overall arrangement view of a search system in the exemplary embodiment. FIG. 1 shows a case in which an owner searches his or her article 103A (or article 103B) lost in a district shown by an area 200. Further, it is assumed that the article 103A includes a colored pattern on a surface thereof and generates a special noise sound.

In view of the above situation, first, the overall arrangement of the search system in the exemplary embodiment, by which the article 103A can be searched, will be briefly explained.

In FIG. 1, a terminal device 1022 is an information processing apparatus for requesting an article management server 104 to be described later to search the position of an article which includes information showing the feature of the article (hereinafter, called "feature information") when it is desired to search the article. Note that the terminal device 1022 may be a mobile terminal device. The terminal device 1022 is connected to the article management server 104 through networks such as the Internet and the like so that information can be communicated therebetween.

When the terminal device 1022 desires to search an article including a certain type of feature information, it requests the article management server 104 to search the position at which the lost article exists. The terminal device 1022 transmits search request information, which includes the article desired to be searched, the feature information of the article desired to be searched, and preferential search area information as an estimated location of the article, as well as time information of a time, at which the search request information is obtained, to the article management server 104 and requests it to search the article.

The article management server 104 is an information processing apparatus for managing, for example, the feature information and the position information of respective articles and the time information of a time at which the above information is obtained.

The article management server 104 receives the search request from the terminal device 1022 and generates article information as information relating to the article based on the search request information.

The article management server 104 issues a search request to a mobile terminal device 102 to be described later, receives a search result from the mobile terminal device 102, creates a database 104D, and updates it when necessary. Then, the article management server 104 notifies the terminal device 1022, to which the search is requested, of the search result.

When the article management server 104 receives the search request of the article from the terminal device 1022, it may particularly receive the feature information of the article and the information of the location, in which the article is estimated to exist, as the preferential search area information.

The preferential search area information is designated as the information, which shows, for example, a certain floor of a building or an area or a range shown by a radius about the center of a certain position as the estimated location of the article. The preferential search area information is, for example, "a second floor or within a radius of 500 m from a column number 1-3".

Further, when the article management server 104 issues the feature information of the article as the information of the article based on the search request information to the mobile terminal device 102 to be described later, the article management server 104 includes such a feature that it preferentially issues the information to a mobile terminal device 102 existing in a preferential search area (for example, the area shown in 200 of FIG. 1).

To realize a function including the feature, first, the article management server 104 receives desired search area information, which shows an area desired to be searched (hereinafter, called "desired area information") together with search desire information showing that the owner of the mobile terminal device 102 desires a search, from the mobile terminal device 102 through a base station 101. Note that the base station 101 is a communication unit for performing a communication between the article management server 104 and the mobile terminal device 102 to be described later.

An area selection unit of the article management server 104 receives the desired area information from the mobile terminal device 102 and the request area information from the search request information DB. The area selection unit extracts the search request information, to which the area in which the area shown by the thus received desired area information is partially or entirely coincident with the area shown by the request area information is designated, from the search request information DB.

Further, an article notification unit of the article management server 104 generates article information based on the search request information which is extracted by the area selection unit and by which the area is designated. A communication unit of the article management server 104 receives the created article information and notifies the mobile terminal device 102, which issues the desired search request, of the article information, that is, the search request information to which the area is designated.

Further, the article management server 104 periodically obtains the feature, the position, and time information of the article from the mobile terminal device 102 and creates the database 104D.

Figures 3, 4:
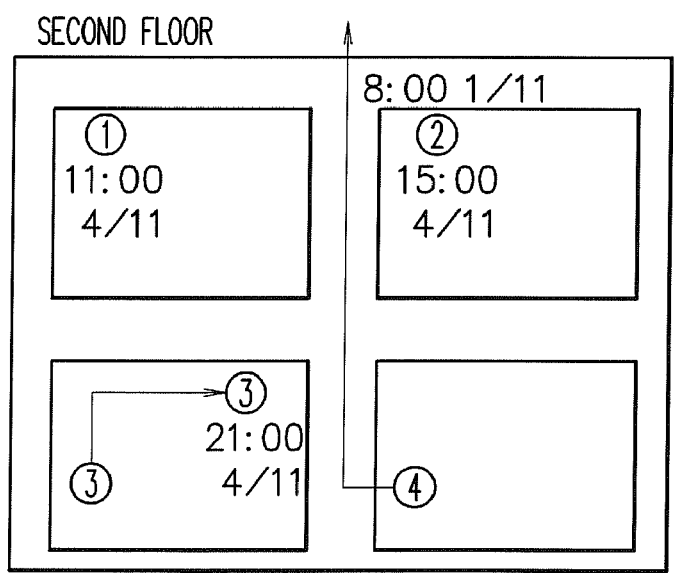
FIG. 3 is a view explaining an input screen of search information of a terminal device according to the exemplary embodiment of the present invention.
FIG. 4 is a view explaining a search result display screen of the terminal device according to the exemplary embodiment of the present invention.

The position information of a position at which the article including the feature is estimated to exist, the feature information of the article obtained by the mobile terminal device 102 through a sensor, and the time at which the information is confirmed are displayed on the screen of the terminal device 1022 based on the thus created database 104D (refer to FIG. 4).

The mobile terminal device 102 is a mobile communication device capable of communicating with the article management server 104 and further includes a position measuring unit such as GPS which can detect the position thereof. The mobile terminal device 102 includes a sound sensor, an image sensor, and the like as well as a function for measuring and analyzing the feature information of articles located in the periphery thereof.

Further, the search system of the exemplary embodiment is a system which uses a plurality of the mobile terminal devices 102 and searches an article by the plurality of mobile terminal devices 102b which are able to move.

Since the mobile terminal device 102 includes the sound sensor, the image sensor, and the like as well as the function for measuring and analyzing the feature information of the articles located in the periphery thereof it can search the position at which the requested article including the feature exists based on the article search information from the article management server 104.

Further, the mobile terminal device 102 notifies the article management server 104 of the position information showing the position at which the requested article exists and the time information of the time at which the position information is measured together with the existence of the feature information of the requested article, wherein the position information and the time information are measured by the position measuring unit.

The article management server 104 obtains the feature information and the position of the notified article and the time information of the time at which the information is measured and updates the database 104D.

When it is desired to search, for example, the article 103A by the search system of the present invention arranged as described above, the article 103A can be searched using the plurality of mobile terminal devices 102 by requesting to search the article from the terminal device 1022 to the article management server 104.

A client can narrow down the positions of the article 103A or the positions near to the article 103A from the detected position information notified from the mobile terminal device 102 which detects the position at which the article 103A including the feature thereof exists or the position near to the article.

When the terminal device 1022 accesses the article management server 104, an article information providing unit 104B of the article management server 104 causes the terminal device 1022 to obtain page information and to output a display for requesting the feature information of the article, a display for requesting the search area information, and a determination/selection display to a display device (refer to FIG. 3).

The user of the terminal device 1022 inputs the feature information of the article desired to be searched as well as inputs area information of an area to be preferentially searched as a specific location name or a position information or the range thereof, determines and selects it. Thus, the input feature information and the position information are transmitted to the article information providing unit 104B of the article management server 104.

Note that the feature information of the article may be input by designating the image data or the audio data showing the feature. Further, the specific location name or the position information may be input by designating a specific location on a map displayed on the display device.

As shown in FIG. 4, the article information providing unit 104B of the article management server 104 transmits the article information to the terminal device 1022 from which it is requested and causes the position information of the article to be displayed on a display of the terminal device 1022 so that the searcher can confirm the searching status of the article. Note that, as to the feature information of the article, a function for displaying measured information in detail may be provided.

Figure 5:
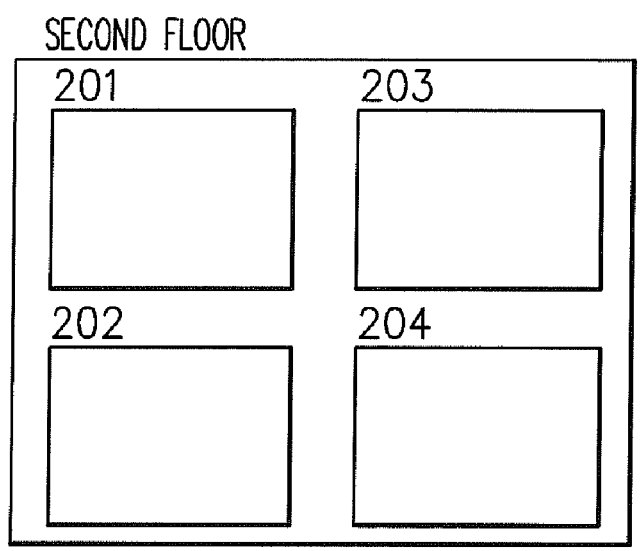
FIG. 5 is a view explaining the data of a position area to a specific location name held in the database of a position management server according to the exemplary embodiment of the present invention.

FIG. 5 is a view explaining position range data to the specific location name held in a location name database 105A of a location name/position range conversion server 105 in FIG. 1. As shown in FIG. 5, the location name database 105A stores the position range information of each specific location name as two-dimensional or three-dimensional data, and a surrounded position range is converted into a specific location name "room number 201 of second floor" and the like. Note that the location name database 105A can be corrected, added, and deleted when necessary.

Figure 6:
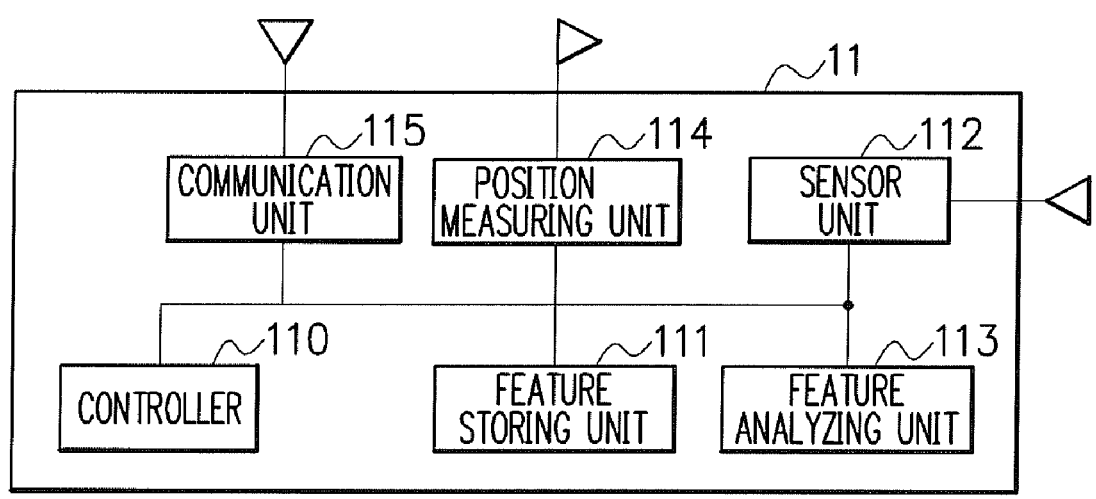
FIG. 6 is a block diagram showing the detail of a mobile terminal device of the search system in the exemplary embodiment of the present invention.

FIG. 6 is a block diagram showing a sensor device 11 of the mobile terminal device 102 in detail. As shown in FIG. 6, the sensor device 11 includes a feature storing unit 111, a sensor unit 112, a feature analyzing unit 113, a position measuring unit 114, a communication unit 115, and a controller 110. The feature storing unit 111 stores the feature information of an article, the sensor unit 112 obtains the information of an article, the feature analyzing unit 113 analyzes and extracts the feature from the obtained information, and the controller 110 controls the sensor device in its entirety.

The sensor unit 112 collects feature information similar to that of the article input from the terminal device 1022 from articles in the periphery thereof.

The feature storing unit 111 stores the feature information of the article sent from the article management server 104 in response to the desired search request.

The feature analyzing unit 113 analyzes and extracts the feature data of the articles from the article information obtained from the sensor unit 112. In particular, the feature analyzing unit 113 extracts the information and the pattern used to search the article and compares them with the feature information stored in the feature storing unit 111.

When the feature analyzing unit 113 discovers similar feature, it transmits the feature information of the article to the article management server 104 making use of the communication unit 115 together with the position information of the article and the discovered time information from the position measuring unit 114. The position measuring unit 114 detects the present position information of the mobile terminal device 102 by, for example, GPS. The mobile terminal device 102 is connected to a plurality of GPS satellites 103 as artificial satellites through satellite lines and provided with the position information thereof as two-dimensional or three-dimensional information through the radio wave from the GPS satellites 103.

FIG. 2 is a view showing an arrangement example of the database 104D of the article management server 104. FIG. 2 shows an example of the article information including phone/IP address information, position information, article feature information, and measurement time.

The phone/IP address information is the phone number or the IP address of the mobile terminal device 102 which has obtained the information of the article. The position information is the position information of the mobile terminal device 102 and the article when the information of the article is obtained. The article feature information is the feature information of the article such as the pattern, the audio and the like measured by the sensor unit. Further, the measurement time is the time at which the feature information is measured.

How the respective devices operate to discover the article in the search system of the exemplary embodiment arranged as described above will be explained below in detail with reference to the drawings.

First, a case in which it is desired to search the article 103A will be explained using FIG. 7.

The terminal device 1022 transmits the information as to the article 103A whose location is desired to be searched to the article management server 104 and requests it to search the article 103A.

At the time, the terminal device 1022 reports at least the feature information of the article 103A as well as the area information of an area to be preferentially searched as to the location of the article if it is known to the article management server 104. An example of the preferential search area information is information such as "second floor", "room number 201-204", and the like.

The article management server 104 transmits the preferential search area information to the location name/position range conversion server 105 which converts the preferential search area information into two-dimensional or three-dimensional coordinate information making use of the location name database 105A.

The article information providing unit 104B of the article management server 104 preferentially transmits article search request information to the mobile terminal device 102 located in the area shown by the preferential search area information based on the preferential search area information from the terminal device 1022. With this operation, preparation for searching the article is completed.

A more specific example of the operation of the article information providing unit 104B will be shown below. When it is requested to search, for example, a preferential search area of "second floor" as the contents of the request, the article information providing unit 104B converts the area shown by the preferential search area into coordinate information by the location name/position range conversion server 105.

Then, the mobile terminal devices 102 passing through the coordinate range is notified of the feature information of the article to which the search request is issued as the article search request.

The notified article is searched by the owner of the mobile terminal device 102 who moves in the area being searched.

The mobile terminal device 102 obtains the information of the colors, the sounds, and the like of the articles in the periphery thereof as it moves from the sensor unit 112. The feature analyzing unit 113 analyzes and extracts feature information from the obtained measurement information and compares it with the feature information stored to the feature storing unit 111.

When the mobile terminal device 102 discovers an article including a feature similar to that of the article being searched, the communication unit 115 notifies the article management server 104 of the feature information of the discovered article and the time at which the feature information is measured. At the same time, the position measuring unit 114 obtains the position information in the vicinity of the discovered location and notifies the communication unit 115 of the position information as detected position information (S211).

The article management server 104 receives the notification and registers the feature information, the position information and measurement time information of the discovered article to the database 104D (S212). When the article management server 104 periodically receives notifications, it can trace and analyze them time-sequentially.

The terminal device 1022 can specify the position of the article similar to the article being searched by accessing the article information providing unit 104B. A display as shown in FIG. 4 can be contemplated as an example.

More specifically, when the article information providing unit 104B requests the article information of a specific location name or position (S213), the article information providing unit 104B obtains the article information in the periphery of the specific location name or the position referring to the database 104D and the location name database 105A (S214).

Next, the article management server 104 delivers the specific location name to the location name/position range conversion server 105 (S215).

The location name/position range conversion server 105 obtains the article information, which is assumed to exist in the location based on the article information of the specific location referring to the database 105A (S216).

The article information providing unit 104B notifies the terminal device 1022 of the article information in the periphery of the position and the article information obtained from the location name/position range conversion server 105 (S217).

Note that the search system can be applied to a gas, a liquid, a semi-fluid substance, and a moving object (a vehicle, a person, and the like) in addition to a concrete solid object.

As described above, in the search system of the exemplary embodiment, since the various types of sensors are mounted on a lot of unspecified mobile communication devices and further the feature analyzing unit is provided to analyze measurement data, the search system can extract feature data from articles and the like located in the vicinity thereof and search the positions of articles and the like including a similar feature.

In particular, since the search system of the exemplary embodiment performs a search making use of the various types of sensors, it is effective to search various articles which are not provided with a wireless tag and the like. Note that the search system can be also used to a search system using a wireless tag and a measuring device 1021 as an auxiliary system.

Note that the respective exemplary embodiments described above are preferable exemplary embodiments of the present invention and may be variously modified within the scope which does not depart from the gist of the present invention. The functions of, for example, the terminal device 1022, the mobile terminal device 102, and the respective servers may be realized by causing the respective devices to read a program for realizing the functions thereof and performing the program. Further, the program may be transmitted to other computer systems through a CD-ROM, a photo-magnetic disc, and the like acting as a recording medium capable of being read by the computers or by a transmission wave through the Internet, a phone line, and the like acting as a transmission medium.

An example of the advantages of the present invention resides in that an article and the like can be effectively searched even if they are not provided with a wireless tag and thus probability of discovery can be enhanced.

What is claimed is:

1. A search system comprising:
   a terminal device for requesting a management server to search a position at which a target whose location is desired to be searched exists by sending search request information, which includes at least the information of the target and the feature of the target, to the management server;
   the management server for receiving the search request from the terminal device and issuing target information, which includes at least target identification information for identifying respective targets and the feature information of the respective targets, to a mobile communication device based on the search request information; and
   at least one mobile communication device which comprises means for obtaining the feature information and means for analyzing and comparing the obtained feature information and the target information issued by the management server and means for measuring the position of the mobile communication device and searches the position at which the feature information of the target whose position is requested to be searched exists based on the target information issued by the management server,
   wherein when the mobile communication device detects the existence of the feature information of the target whose position is requested to be searched, the mobile communication device notifies the management server of the detected position information and the time information together with the feature information of the target; and
   the management server notifies the terminal device of the position information of the target estimated based on the detected position information, the time information and the feature information of the target and causes the terminal device to output the information.

2. The search system according to claim 1, wherein the management server device holds preferential search area information showing an area to be preferentially searched which is received from the terminal device and causes the mobile communication device locating in a predetermined area to preferentially perform a search based on the preferential search area information.

3. The search system according to claim 1, wherein when the mobile communication device detects the existence of the feature information of the target whose position is requested to be searched, the mobile communication device periodically notifies the management server of the detected position information and the time information together with the feature information of the target.

4. A management server of a search system which comprises:
   a terminal device for requesting a management server to search a position at which a target whose location is desired to be searched exists by sending search request information, which includes at least the information of the target and the feature of the target, to the management server;
   the management server for receiving the search request from the terminal device and issuing target information, which includes at least target identification information for identifying respective targets and the feature information of the respective targets, to a mobile communication device based on the search request information; and
   at least one mobile communication device which comprises means for obtaining the feature information and means for analyzing and comparing the obtained feature information and the target information issued by the management server and means for measuring the position of the mobile communication device and searches the position at which the feature information of the target whose position is requested to be searched exists based on the target information issued by the management server,
   wherein when the mobile communication device detects the existence of the feature information of the target whose position is requested to be searched, the management server is notified of the detected position information and the time information together with the feature information of the target; and
   the management server notifies the terminal device of the position information of the target estimated based on the detected position information, the time information and the feature information of the target and causes the terminal device to output the information.

5. The management server system according to claim 4, wherein the management server device holds preferential search area information showing an area to be preferentially searched which is received from the terminal device and causes the mobile communication device locating in a predetermined area to preferentially perform a search based on the preferential search area information.

6. The management server according to claim 4, wherein when the mobile communication device detects the existence of the feature information of the target whose position is requested to be searched, the management server is periodically notified of the detected position information and the time information together with the feature information of the target.

7. A mobile communication device of a search system which comprises:
   a terminal device for requesting a management server to search a position at which a target whose location is desired to be searched exists by sending search request information, which includes at least the information of the target and the feature of the target, to the management server;
   a management server for receiving the search request from the terminal device and issuing target information, which includes at least target identification information for identifying respective targets and the feature information of the respective targets, to a mobile communication device based on the search request information; and
   at least one mobile communication device which comprises means for obtaining the feature information and means for analyzing and comparing the obtained feature information and the target information issued by the management server and means for measuring the position of the mobile communication device and searches the position at which the feature information of the target whose position is requested to be searched exists based on the target information issued by the management server,
   wherein when the mobile communication device detects the existence of the feature information of the target whose position is requested to be searched, the mobile communication device notifies the detected position information and time information together with the feature information of the target; and
   the management server notifies the terminal device of the position information of the target estimated based on the detected position information, the time information and the feature information of the target and causes the terminal device to output the information.

8. A search method making use of:
   a terminal device for requesting a management server to search a position at which a target whose location is desired to be searched exists by sending search request information, which includes at least the information of the target and the feature of the target, to the management server;
   the management server for receiving the search request from the terminal device and issuing target information, which includes at least target identification information for identifying respective targets and the feature information of the respective targets, to a mobile communication device based on the search request information; and
   at least one mobile communication device which comprises means for obtaining the feature information and means for analyzing and comparing the obtained feature information and the target information issued by the management server and means for measuring the position of the mobile communication device and searches the position at which the feature information of the target whose position is requested to be searched exists based on the target information issued by the management server,
   the search method comprising the steps of:
   notifying, when the mobile communication device detects the existence of the feature information of the target whose position is requested to be searched, the management server of the detected position information and time information together with the feature information of the target from the mobile communication device; and
   notifying the terminal device of the position information of the target estimated based on the detected position information, time information and the feature information of the target from the management server and causing the terminal device to output the position information.

9. The search system according to claim 8, wherein the management server device holds preferential search area information showing an area to be preferentially searched which is received from the terminal device and causes the mobile communication device locating in a predetermined area to preferentially perform a search based on the preferential search area information.

10. The search method according to claim 8, wherein when the mobile communication device detects the existence of the feature information of the target whose position is requested to be searched, the mobile communication device periodically notifies the management server of the detected position information and the time information together with the feature information of the target.

* * * * *